United States Patent
Begin et al.

(10) Patent No.: US 9,897,097 B2
(45) Date of Patent: Feb. 20, 2018

(54) TURBOCHARGER WITH A HYBRID JOURNAL BEARING SYSTEM

(71) Applicant: GM GLOBAL TECHNOLOGY OPERATIONS LLC, Detroit, MI (US)

(72) Inventors: Louis P. Begin, Rochester, MI (US); Dingfeng Deng, Auburn Hills, MI (US); Isaac H. Y. Du, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 409 days.

(21) Appl. No.: 14/602,405

(22) Filed: Jan. 22, 2015

(65) Prior Publication Data

US 2016/0215785 A1  Jul. 28, 2016

(51) Int. Cl.
*F04D 29/056* (2006.01)
*F04D 17/10* (2006.01)
(Continued)

(52) U.S. Cl.
CPC ......... *F04D 29/056* (2013.01); *F01D 25/166* (2013.01); *F04D 25/024* (2013.01);
(Continued)

(58) Field of Classification Search
CPC ..... F04D 29/056; F04D 25/024; F02M 26/04; F01D 25/166; F02B 37/00; F05D 2220/40; F05D 2240/53; F16C 32/0629; F16C 32/0633; F16C 32/064; F16C 32/0644; F16C 32/0688; F16C 32/0692; F16C 32/0696; F16C 33/7836

USPC ............ 415/229; 417/423.12, 323; 29/889.4; 60/597, 598, 605.1, 605.2, 608, 614; 123/568.11, 559.1, 559.2

See application file for complete search history.

(56) References Cited

U.S. PATENT DOCUMENTS 4,641,977 A * 2/1987 Woollenweber ........ F16C 21/00
384/101
5,613,781 A * 3/1997 Kuzdzal .................. F16C 17/03
384/215

(Continued)

FOREIGN PATENT DOCUMENTS

CN  101776001 A  7/2010
CN  104251156 A  12/2014

*Primary Examiner* — Thomas Moulis
*Assistant Examiner* — John Bailey
(74) *Attorney, Agent, or Firm* — Quinn IP Law

(57) ABSTRACT

A turbocharger for an internal combustion engine includes a bearing housing defining a bearing bore and a hybrid journal bearing system disposed within the bore. The hybrid journal bearing system includes first and second journal bearings. The first journal bearing is a semi-floating bearing and the second journal bearing is a full-floating bearing. The turbocharger also includes a shaft having a first end and a second end, wherein the shaft is supported by the journal bearing system for rotation about an axis within the bore. The turbocharger also includes a turbine wheel fixed to the shaft proximate to the first end and configured to be rotated about the axis by post-combustion gases emitted by the engine. Additionally, the turbocharger includes a compressor wheel fixed to the shaft proximate to the second end and configured to pressurize an airflow being received from the ambient for delivery to the engine.

20 Claims, 3 Drawing Sheets

(51) Int. Cl.

| | | |
|---|---|---|
| *F04D 25/04* | (2006.01) | |
| *F02M 25/07* | (2006.01) | |
| *F04D 25/02* | (2006.01) | |
| *F01D 25/16* | (2006.01) | |
| *F16C 17/02* | (2006.01) | |
| *F16C 17/18* | (2006.01) | |
| *F16C 17/26* | (2006.01) | |
| *F16C 27/02* | (2006.01) | |
| *F02B 37/00* | (2006.01) | |

(52) U.S. Cl.
CPC .............. *F16C 17/02* (2013.01); *F16C 17/18* (2013.01); *F16C 17/26* (2013.01); *F16C 27/02* (2013.01); *F02B 37/00* (2013.01); *F05D 2220/40* (2013.01); *F05D 2240/53* (2013.01)

(56) References Cited

U.S. PATENT DOCUMENTS

| | | | |
|---|---|---|---|
| 5,924,286 A | 7/1999 | Kapich | |
| 6,032,466 A | 3/2000 | Woollenweber et al. | |
| 6,250,897 B1* | 6/2001 | Thompson | F01D 25/164 184/6.11 |
| 6,418,722 B1* | 7/2002 | Arnold | F01D 25/168 417/407 |
| 6,616,421 B2 | 9/2003 | Mruk et al. | |
| 6,647,935 B2* | 11/2003 | Aoyama | F01L 1/024 123/198 F |
| 6,814,537 B2* | 11/2004 | Olsen | F01D 1/08 415/111 |
| 7,946,118 B2 | 5/2011 | Hippen et al. | |
| 8,628,247 B2* | 1/2014 | Uesugi | F01D 25/166 384/397 |
| 9,382,812 B2* | 7/2016 | Meacham | F02C 6/12 |
| 9,534,632 B2* | 1/2017 | Oki | F16C 33/106 |
| 9,599,149 B2* | 3/2017 | Ryu | F01D 25/16 |
| 2003/0026715 A1 | 2/2003 | Ojima et al. | |
| 2006/0204154 A1* | 9/2006 | Ward | F01D 25/166 384/100 |
| 2009/0110572 A1* | 4/2009 | Meacham | F02C 6/12 417/406 |
| 2009/0238689 A1* | 9/2009 | Jamil | F01D 25/166 415/229 |
| 2011/0048000 A1* | 3/2011 | Kley | F01D 25/16 60/598 |
| 2011/0052388 A1* | 3/2011 | Mavrosakis | F01D 25/162 415/229 |
| 2011/0075957 A1* | 3/2011 | Gutknecht | F01D 25/16 384/286 |
| 2011/0176907 A1* | 7/2011 | Groves | F01D 25/166 415/1 |
| 2013/0115080 A1* | 5/2013 | Castan | F01D 25/162 415/229 |
| 2013/0205775 A1* | 8/2013 | Begin | F01D 25/166 60/605.3 |
| 2013/0255252 A1* | 10/2013 | Fonville | F01D 25/168 60/605.3 |
| 2014/0369865 A1* | 12/2014 | Marsal | F01D 25/166 417/406 |
| 2015/0093233 A1* | 4/2015 | Daguin | F01D 25/162 415/1 |
| 2015/0176593 A1* | 6/2015 | Dayalan | F16C 33/1045 415/1 |
| 2015/0240871 A1* | 8/2015 | Oki | F16C 33/106 384/397 |
| 2015/0292562 A1* | 10/2015 | Maeda | F01D 25/16 384/280 |

\* cited by examiner

TURBOCHARGER WITH A HYBRID JOURNAL BEARING SYSTEM

TECHNICAL FIELD

The present disclosure relates to a turbocharger with a hybrid journal bearing system.

BACKGROUND

Internal combustion engines (ICE) are often called upon to generate considerable levels of power for prolonged periods of time on a dependable basis. Many such ICE assemblies employ a supercharging device, such as an exhaust gas turbine driven turbocharger, to compress the airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power.

A typical turbocharger employs a central shaft that transmits rotational motion between an exhaust-driven turbine wheel and an air compressor wheel. Such a shaft is typically supported by one or more bearings which are cooled and lubricated by engine oil, and frequently also receive additional cooling from a specially formulated engine coolant.

SUMMARY

One embodiment of the disclosure is directed to a turbocharger for an internal combustion engine that includes a bearing housing defining a bearing bore and a hybrid journal bearing system disposed within the bore. The hybrid journal bearing system includes a first journal bearing and a second journal bearing. The first journal bearing is a semi-floating bearing and the second journal bearing is a full-floating bearing. The turbocharger also includes a shaft having a first end and a second end, wherein the shaft is supported by the journal bearing system for rotation about an axis within the bore. The turbocharger also includes a turbine wheel fixed to the shaft proximate to the first end and configured to be rotated about the axis by post-combustion gases emitted by the engine. Additionally, the turbocharger includes a compressor wheel fixed to the shaft proximate to the second end and configured to pressurize an airflow being received from the ambient for delivery to the engine.

The first journal bearing may be arranged proximate to the first end of the shaft and the second journal bearing may be arranged proximate to the second end of the shaft.

A fluid pressurized by an engine fluid pump may be directed to lubricate the hybrid journal bearing system and generate or form a first fluid film between the hybrid journal bearing system and the shaft.

The pressurized fluid may also be directed to generate a second fluid film in the bore between the hybrid journal bearing system and the bearing housing.

Each of the first journal bearing and the second journal bearing may include a first surface defined by a respective inner diameter and a second surface defined by a respective outer diameter. Additionally, each of the first journal bearing and the second journal bearing may define a passage that connects the first and second surfaces.

The fluid pump may be in fluid communication with the passage in the first journal bearing and the passage in the second journal bearing.

The pressurized fluid may be directed to form the first fluid film and the second fluid film via the respective passages in the first journal bearing and in the second journal bearing.

Each respective passage in the first journal bearing and the second journal bearing may include a plurality of passages and the fluid pump may feed the pressurized fluid through each of the plurality of passages.

At least one of the first journal bearing and the second journal bearing may be configured from one of brass and bronze.

The hybrid journal bearing system may be configured to minimize a sub-synchronous resonance vibration of the shaft.

Another embodiment of the present disclosure is directed to an internal combustion engine having the turbocharger described above.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
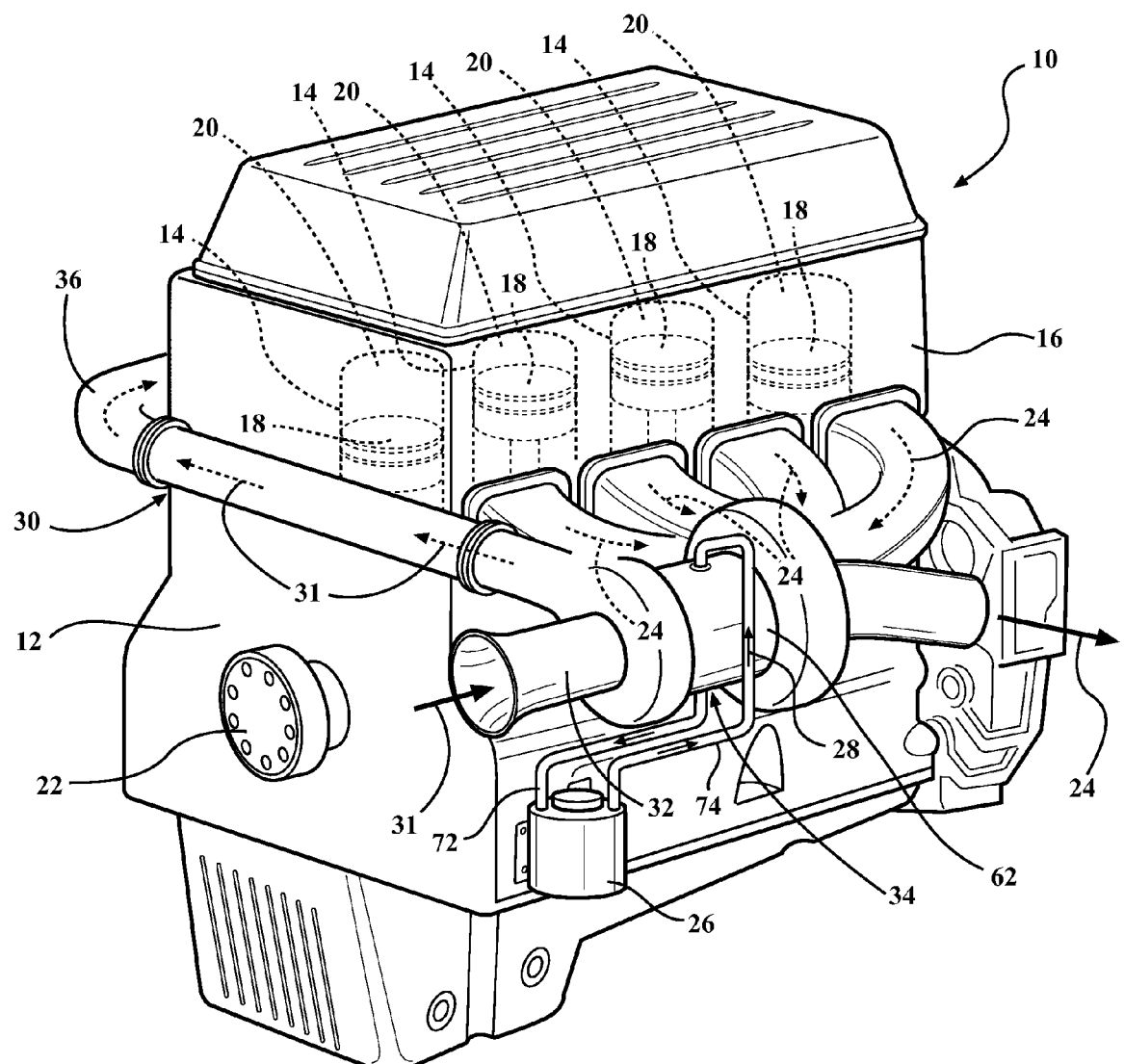
FIG. 1 is a schematic perspective view of an engine with a turbocharger according to the disclosure.

Referring to the drawings wherein like reference numbers correspond to like or similar components throughout the several figures, FIG. 1 illustrates an internal combustion engine 10. The engine 10 also includes a cylinder block 12 with a plurality of cylinders 14 arranged therein. As shown, the engine 10 also includes a cylinder head 16. Each cylinder 14 includes a piston 18 configured to reciprocate therein. Combustion chambers 20 are formed within the cylinders 14 between the bottom surface of the cylinder head 16 and the tops of the pistons 18. As known by those skilled in the art, combustion chambers 20 are configured to receive a fuel-air mixture for subsequent combustion therein.

The engine 10 also includes a crankshaft 22 configured to rotate within the cylinder block 12. The crankshaft 22 is rotated by the pistons 18 as a result of an appropriately proportioned fuel-air mixture being burned in the combustion chambers 20. After the air-fuel mixture is burned inside a specific combustion chamber 20, the reciprocating motion of a particular piston 18 serves to exhaust post-combustion gases 24 from the respective cylinder 14. The engine 10 also includes a fluid pump 26. The fluid pump 26 is configured to supply a lubricating fluid 28, such as engine oil. Accordingly, the fluid pump 26 may supply the lubricating fluid 28 to various bearings, such as that of the crankshaft 22. The fluid pump 26 may be driven directly by the engine 10, or by an electric motor (not shown).

The engine 10 additionally includes an induction system 30 configured to channel airflow 31 from the ambient to the cylinders 14. The induction system 30 includes an intake air duct 32, a turbocharger 34, and an intake manifold 36. Although not shown, the induction system 30 may additionally include an air filter upstream of the turbocharger 34 for removing foreign particles and other airborne debris from the airflow 31. The intake air duct 32 is configured to channel the airflow 31 from the ambient to the turbocharger 34, while the turbocharger is configured to pressurize the received airflow, and discharge the pressurized airflow to the intake manifold 36. The intake manifold 36, in turn, distributes the previously pressurized airflow 31 to the cylinders 14 for mixing with an appropriate amount of fuel and subsequent combustion of the resultant fuel-air mixture.

Figure 2:
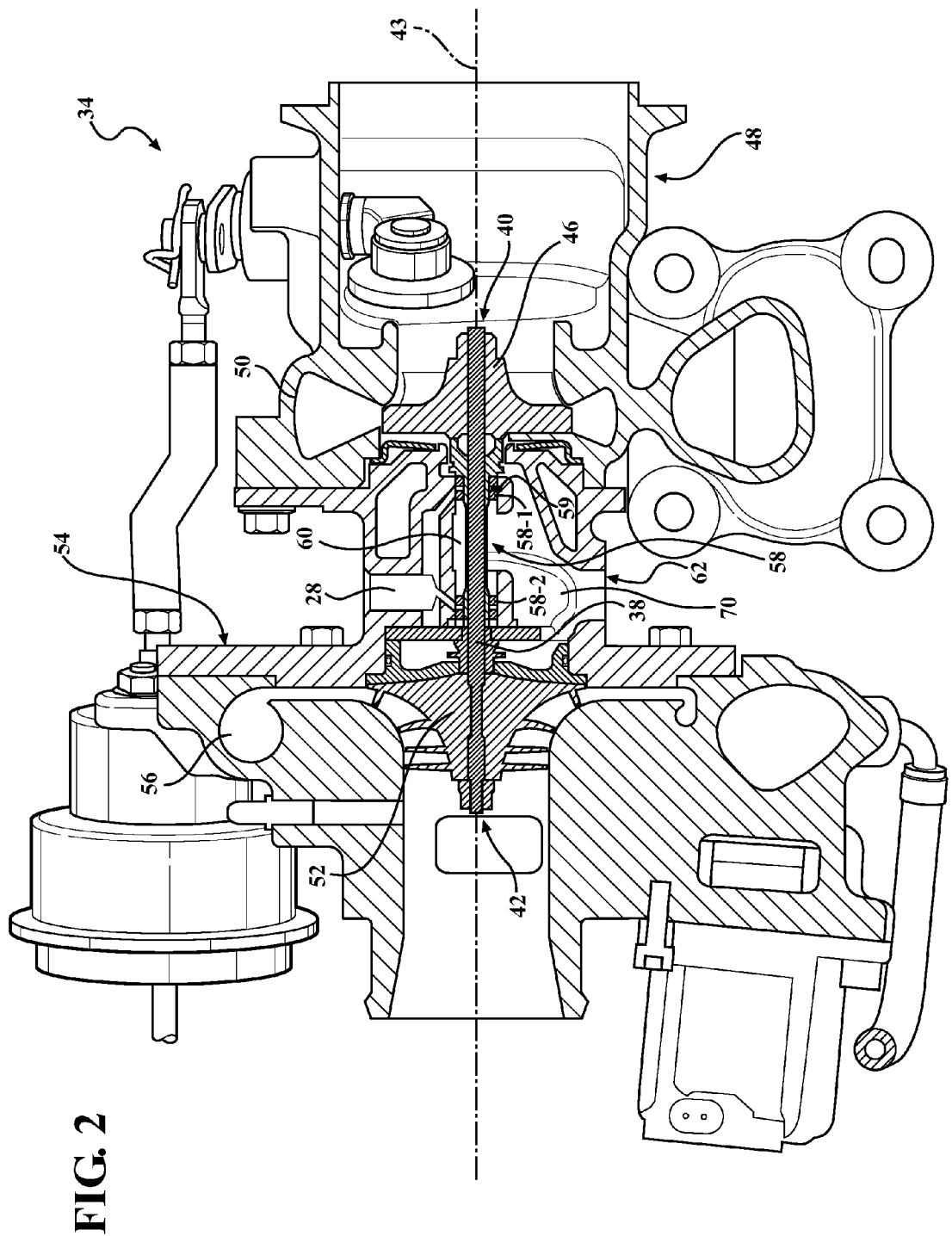
FIG. 2 is a schematic cross-sectional view of the turbocharger shown in FIG. 1, wherein the turbocharger includes a bearing housing with a hybrid journal bearing system.

As shown in FIG. 2, the turbocharger 34 includes a steel shaft 38 having a first end 40 and a second end 42. A turbine wheel 46 is mounted on the shaft 38 proximate to the first end 40 and configured to be rotated along with the shaft 38 about an axis 43 by post-combustion gases 24 emitted from the cylinders 14. The turbine wheel 46 is disposed inside a turbine housing 48 that includes a volute or scroll 50. The scroll 50 receives the post-combustion exhaust gases 24 and directs the exhaust gases to the turbine wheel 46. The scroll 50 is configured to achieve specific performance characteristics, such as efficiency and response, of the turbocharger 34.

As further shown in FIG. 2, the turbocharger 34 also includes a compressor wheel 52 mounted on the shaft 38 proximate to the second end 42. The compressor wheel 52 is configured to pressurize the airflow 31 being received from the ambient for eventual delivery to the cylinders 14. The compressor wheel 52 is disposed inside a compressor cover 54 that includes a volute or scroll 56. The scroll 56 receives the airflow 31 and directs the airflow to the compressor wheel 52. The scroll 56 is configured to achieve specific performance characteristics, such as peak airflow and efficiency of the turbocharger 34. Accordingly, rotation is imparted to the shaft 38 by the post-combustion exhaust gases 24 energizing the turbine wheel 46, and is, in turn, communicated to the compressor wheel 52 owing to the compressor wheel being fixed on the shaft. As understood by those skilled in the art, the variable flow and force of the post-combustion exhaust gases 24 influences the amount of boost pressure that may be generated by the compressor wheel 52 throughout the operating range of the engine 10.

With continued reference to FIG. 2, the shaft 38 is supported for rotation about the axis 43 via a hybrid journal bearing system 58. The hybrid journal bearing system 58 is disposed within a bore 60 of a bearing housing 62 and is configured to control radial motion and vibrations of the shaft 38. Furthermore, the hybrid journal bearing system 58 is configured to minimize a sub-synchronous resonance vibration of the shaft 38, as described below. The hybrid journal bearing system 58 includes a first journal bearing 58-1 and a second journal bearing 58-2. The first journal bearing 58-1 and the second journal bearing 58-2 are lubricated and cooled by the supply of pressurized lubricating fluid 28 supplied via the fluid pump 26 to the bearing housing 62. The bearing housing 62 may be cast from a robust material such as iron in order to provide dimensional stability to the bore 60 under elevated temperatures and loads during operation of the turbocharger 34.

The first journal bearing 58-1 is a semi-floating bearing that is typically formed from a relatively soft metal, for example brass or bronze, such that the majority of wear from any contact between the shaft and the bearing would take place in the bearing. The semi-floating first journal bearing 58-1 is generally restrained from shifting along the axis 43, but is provided with some freedom to shift radially within the bore 60, i.e., in a direction that is transverse to the axis 43. Such provision to shift radially, allows the first journal bearing 58-1 to take up any radial displacement of the shaft 38, which may develop as a result of an imbalance in the shaft, turbine wheel 46, and/or the compressor wheel 52. Generally, semi-floating journal bearings are provided with sufficient clearance between the bearing and the shaft 38 to form a first oil film 28A and between the bearing and the bearing housing 62 at the bore 60 to form a second oil film 28B in the subject clearance locations. Additionally, semi-floating journal bearings are configured to maintain the second oil film 28B in the bore 60, while being secured against rotation within the bore. Accordingly, the first journal bearing 58-1 is restrained from rotating relative to the bearing housing 62 by adjacent components, such as an anti-rotation pin or key 59, but is also configured to squeeze the second oil film 28B against the bore. Additionally, the first journal bearing 58-1 is configured to squeeze the first oil film 28A against the shaft 38.

The second journal bearing 58-2 is a full-floating bearing that is generally restrained from shifting along the axis 43, but is provided with sufficient clearance both between the bearing and the shaft 38 and between the bearing and the bearing housing 62 at the bore 60 to generate an oil film in both clearance locations. Accordingly, the first oil film 28A is formed between the second journal bearing 58-2 and the shaft 38, while the second oil film 28B is formed between the second journal bearing and the bearing housing 62 at the bore 60. Additionally, full-floating journal bearings are free to rotate in the bore 60. Accordingly, the second journal bearing 58-2 can rotate relative to the bearing housing 62, while also being configured to maintain the first and second oil films 28A, 28B.

Typically, full-floating journal bearings are capable of significantly greater oil flow than non-floating journal bearings, primarily due to the full-floating bearings' capability to rotate within the bore. Hence, for equivalent clearances between sliding surfaces, full-floating journal bearings experience enhanced cooling characteristics, as compared to non-floating journal bearings. Accordingly, reduced operating temperatures at high rotating speeds can generally be obtained by using a full-floating journal bearing in place of a non-floating journal bearing. Similar to the first journal bearing 58-1, the second journal bearing 58-2 may be formed from a relatively soft metal, such as brass or bronze, such that the majority of wear from any contact between the shaft and the bearing, as well as between the housing and the bearing, would take place in the bearing.

Figure 3:
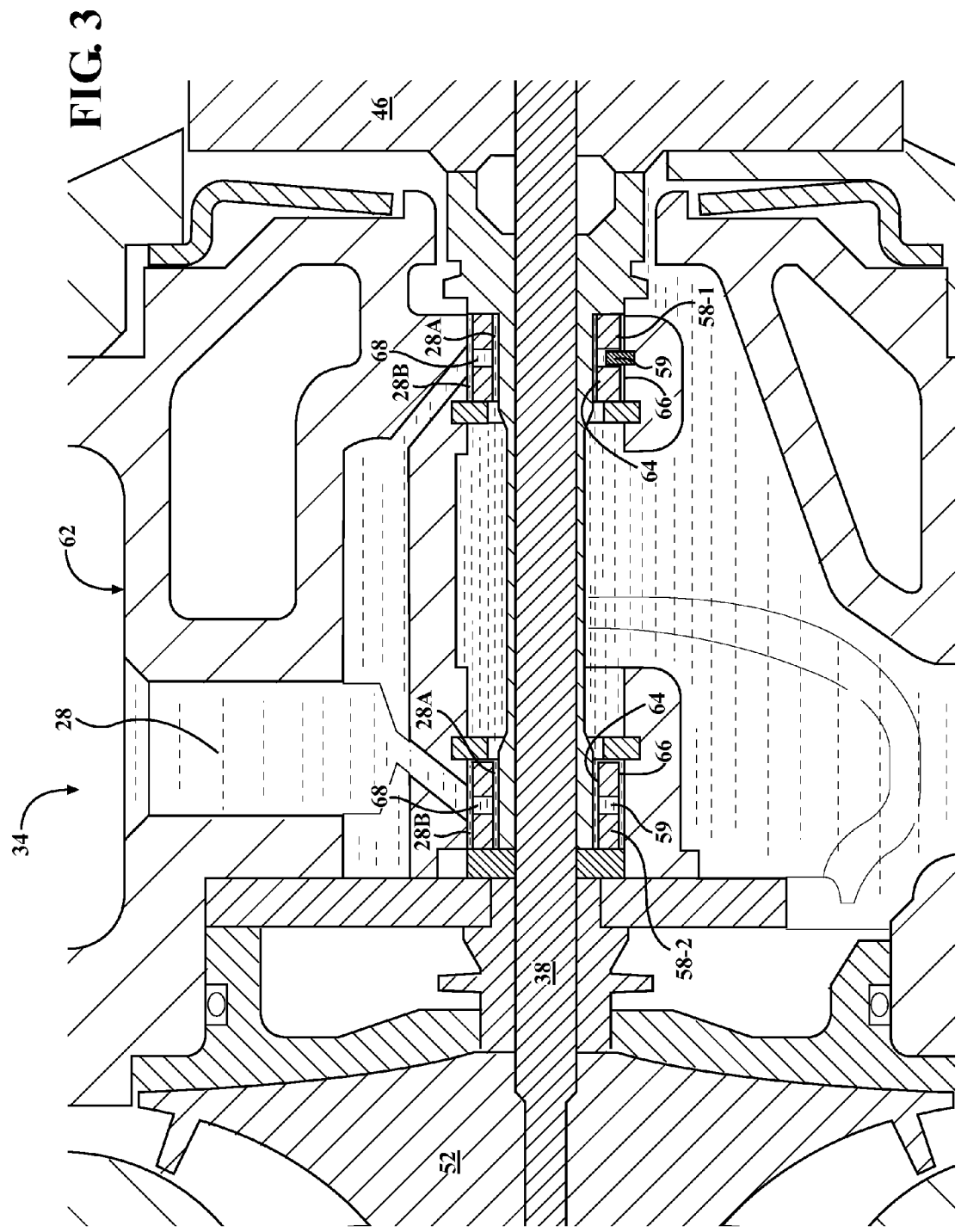
FIG. 3 is a schematic close-up cross-sectional view of the bearing housing shown in FIG. 2, specifically showing details of the hybrid journal bearing system having a semi-floating bearing and a full-floating bearing.

As shown in FIGS. 2-3, the first semi-floating journal bearing 58-1 may be arranged proximate to the first end 40 and the second full-floating journal bearing 58-2 may be arranged proximate to the second end 42 of the shaft 38. Mathematical and empirical analyses have shown that the use of the hybrid journal bearing system 58 in the turbocharger 34 is effective in controlling excitation forces due to sub-synchronous resonance. Sub-synchronous resonance tends to destabilize rotation of the shaft 38 and may result in noise, vibration, and harshness (NVH) concerns during operation of the turbocharger. Sub-synchronous resonance phenomenon thus counteracted by the hybrid journal bearing system 58 is described in greater detail below.

In general, the shaft of rotating equipment, such as of the turbocharger 34, has a natural resonant frequency. Such a resonant frequency may fall below the actual operating speed of the rotating equipment. As the shaft is being accelerated from standstill to normal operating frequency, there is a point at which the instantaneous speed passes the resonant point and the equipment experiences an increased degree of vibration. The resonant frequency of the shaft may also coincide with a natural resonant frequency of the supporting journal bearings, such that there is a sustained, cyclic exchange of energy between the shaft and the bearings. Such an exchange of energy results in vibration of and torsional stress on the shaft that can lead to damage of the shaft and the supporting journal bearings and is a phenomenon that is designated "sub-synchronous resonance". Accordingly, the hybrid journal bearing system 58 is intended to minimize such sub-synchronous resonance vibration of the shaft 38.

During operation of the turbocharger 34, the pressurized lubricating fluid 28 from the fluid pump 26 is delivered to the bearing housing 62 and directed to the hybrid journal bearing system 58 to lubricate the bearings 58-1, 58-2 and generate the first oil film 28A between the bearings' inner diameter and the shaft 38, and the second oil film 28B between their outer diameter and the housing bore 60. The subject oil films provide a hydro-dynamic damping layer for supporting the rotating shaft 38 during operation of the turbocharger 34, thus reducing the likelihood of direct physical contact between the bearings 58-1, 58-2 and the shaft 38, and the bearing 58-2 and the housing 62. In turn, such reduction of direct contact between the bearings 58-1, 58-2, the shaft 38, and the housing 62 extends useful life of the bearings, reduces frictional losses in the turbocharger 34, reduces NVH, and enhances response of the turbocharger during operation thereof.

As shown in FIG. 3, each of the first journal bearing 58-1 and the second journal bearing 58-2 includes a first surface 64 defined by a respective inner diameter ID and a second surface 66 defined by a respective outer diameter OD. As also shown in FIG. 3, each of the first journal bearing 58-1 and the second journal bearing 58-2 defines one or more passages 68 that connect the first and second surfaces 64, 66. The fluid pump 26 is in fluid communication with the passages 68 in the first and second journal bearings 58-1, 58-2. Accordingly, the pressurized fluid 28 is directed via the respective passages 68 to form the first and second fluid films 28A, 28B at the first journal bearing 58-1, as well as the first and second fluid films 28A, 28B at the second journal bearing 58-2.

With resumed reference to FIG. 2, the bearing housing 62 includes a drain volume 70 for the engine oil that is supplied to the bearing housing from the fluid pump 26. The drain volume 70 is an inner reservoir incorporated into the bearing housing 62, and may have an as-cast shape. With resumed reference to FIG. 1, a discharge passage 72 removes oil from the bearing housing 62 following the lubrication of the first and second journal bearings 58-1, 58-2 and the oil's collection within the drain volume 70. As also shown in FIG. 1, the discharge passage 72 is in fluid communication with the fluid pump 26 in order to return to the pump the oil from the drain volume 70. A supply passage 74 channels oil from the fluid pump 26 to the bearing housing 62, thus establishing continuous circulation of lubricating oil through the bearing housing during operation of the turbocharger 34.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An internal combustion engine comprising:
    an engine block defining a cylinder with a combustion chamber configured to receive an air-fuel mixture for combustion therein and configured to exhaust post-combustion gases therefrom; and
    a turbocharger including:
        a bearing housing defining a bearing bore;
        a hybrid journal bearing system disposed within the bore and having a first journal bearing and a second journal bearing;
        a shaft having a first end and a second end, the shaft being supported by the journal bearing system for rotation about an axis within the bore;
        a turbine wheel fixed to the shaft proximate to the first end and configured to be rotated about the axis by the post-combustion gases; and
        a compressor wheel fixed to the shaft proximate to the second end and configured to pressurize an airflow being received from the ambient for delivery to the cylinder;
        wherein the first journal bearing is a semi-floating bearing and the second journal bearing is a full-floating bearing.

2. The engine of claim 1, wherein the first journal bearing is arranged proximate to the first end of the shaft and the second journal bearing is arranged proximate to the second end of the shaft.

3. The engine of claim 1, further comprising a fluid pump configured to pressurize a fluid, wherein the pressurized fluid is directed to lubricate the hybrid journal bearing system and generate a first fluid film between the hybrid journal bearing system and the shaft.

4. The engine of claim 3, wherein the pressurized fluid is directed to generate a second fluid film between the hybrid journal bearing system and the bearing housing.

5. The engine of claim 4, wherein each of the first journal bearing and the second journal bearing includes a first surface defined by a respective inner diameter and a second surface defined by a respective outer diameter, and wherein each of the first journal bearing and the second journal bearing defines a passage that connects the first and second surfaces.

6. The engine of claim 5, wherein the fluid pump is in fluid communication with each of the passage in the first journal bearing and the passage in the second journal bearing.

7. The engine of claim 6, wherein the pressurized fluid is directed to form the first fluid film and the second fluid film via the respective passages in the first journal bearing and the second journal bearing.

8. The engine of claim 7, wherein each respective passage in the first journal bearing and passage in second journal bearing includes a plurality of passages and the fluid pump feeds the pressurized fluid through each of the plurality of passages.

9. The engine of claim 1, wherein at least one of the first journal bearing and the second journal bearing is configured from one of brass and bronze.

10. The engine of claim 1, wherein the hybrid journal bearing system is configured to minimize a sub-synchronous resonance vibration of the shaft.

11. A turbocharger for an internal combustion engine, the turbocharger comprising:
   a bearing housing defining a bearing bore;
      a hybrid journal bearing system disposed within the bore and having a first journal bearing and a second journal bearing;
      a shaft having a first end and a second end, the shaft being supported by the journal bearing system for rotation about an axis within the bore;
      a turbine wheel fixed to the shaft proximate to the first end and configured to be rotated about the axis by the post-combustion gases; and
      a compressor wheel fixed to the shaft proximate to the second end and configured to pressurize an airflow being received from the ambient for delivery to the cylinder;
   wherein the first journal bearing is a semi-floating bearing and the second journal bearing is a full-floating bearing.

12. The turbocharger of claim 11, wherein the first journal bearing is arranged proximate to the first end of the shaft and the second journal bearing is arranged proximate to the second end of the shaft.

13. The turbocharger of claim 11, further comprising a fluid pump configured to pressurize a fluid, wherein the pressurized fluid is directed to lubricate the hybrid journal bearing system and generate a first fluid film between the hybrid journal bearing system and the shaft.

14. The turbocharger of claim 13, wherein the pressurized fluid is directed to generate a second fluid film between the hybrid journal bearing system and the bearing housing.

15. The turbocharger of claim 14, wherein each of the first journal bearing and the second journal bearing includes a first surface defined by a respective inner diameter and a second surface defined by a respective outer diameter, and wherein each of the first journal bearing and the second journal bearing defines a passage that connects the first and second surfaces.

16. The turbocharger of claim 15, wherein the fluid pump is in fluid communication with each of the passage in the first journal bearing and the passage in the second journal bearing.

17. The turbocharger of claim 16, wherein the pressurized fluid is directed to form the first fluid film and the second fluid film via the respective passages in the first journal bearing and the second journal bearing.

18. The turbocharger of claim 17, wherein each respective passage in the first journal bearing and passage in second journal bearing includes a plurality of passages and the fluid pump feeds the pressurized fluid through each of the plurality of passages.

19. The turbocharger of claim 11, wherein at least one of the first journal bearing and the second journal bearing is configured from one of brass and bronze.

20. The turbocharger of claim 11, wherein the hybrid journal bearing system is configured to minimize a sub-synchronous resonance vibration of the shaft.

* * * * *